United States Patent
Kashiwagi et al.

(10) Patent No.: US 11,300,039 B2
(45) Date of Patent: Apr. 12, 2022

(54) PRECOMBUSTION CHAMBER GAS ENGINE

(71) Applicant: MITSUBISHI HEAVY INDUSTRIES ENGINE & TURBOCHARGER, LTD., Sagamihara (JP)

(72) Inventors: Masahiro Kashiwagi, Tokyo (JP); Daigo Watanabe, Tokyo (JP); Yuta Furukawa, Sagamihara (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 207 days.

(21) Appl. No.: 16/649,864

(22) PCT Filed: Aug. 28, 2018

(86) PCT No.: PCT/JP2018/031833
§ 371 (c)(1),
(2) Date: Mar. 23, 2020

(87) PCT Pub. No.: WO2019/065053
PCT Pub. Date: Apr. 4, 2019

(65) Prior Publication Data
US 2021/0363914 A1  Nov. 25, 2021

(30) Foreign Application Priority Data
Sep. 29, 2017 (JP) .............................. JP2017-190263

(51) Int. Cl.
*F02B 19/18* (2006.01)
(52) U.S. Cl.
CPC .................................. *F02B 19/18* (2013.01)
(58) Field of Classification Search
CPC ...... F02B 19/18; F02B 19/12; F02B 19/1014; F02B 43/00; F02B 19/16; F02M 21/0281; Y02T 10/12
See application file for complete search history.

(56) References Cited

U.S. PATENT DOCUMENTS

| | | | |
|---|---|---|---|
| 5,950,593 A | 9/1999 | Matsuoka et al. | |
| 2003/0213461 A1 | 11/2003 | Regueiro | |
| 2007/0089703 A1 | 4/2007 | Shiraishi et al. | |
| 2013/0000598 A1 | 1/2013 | Tokuoka et al. | |
| 2013/0206101 A1* | 8/2013 | Douglas ................. | F02B 19/12 123/260 |

(Continued)

FOREIGN PATENT DOCUMENTS

| | | |
|---|---|---|
| EP | 1 777 385 A2 | 4/2007 |
| EP | 2 700 796 A1 | 2/2014 |

(Continued)

OTHER PUBLICATIONS

International Preliminary Report on Patentability and Written Opinion of the International Searching Authority for International Application No. PCT/JP2018/031833, dated Apr. 9, 2020, with English translation.

(Continued)

*Primary Examiner* — Xiao En Mo
(74) *Attorney, Agent, or Firm* — Birch, Stewart, Kolasch & Birch, LLP

(57) ABSTRACT

A precombustion chamber gas engine includes a main-chamber forming portion forming a main combustion chamber, and a precombustion-chamber forming portion forming a precombustion chamber communicating with the main combustion chamber via a plurality of nozzle holes. The precombustion-chamber forming portion includes a cylindrical portion extending along an extension direction of a precombustion chamber central axis of the precombustion-chamber forming portion, and a tip portion closing a main-combustion-chamber-side end of the cylindrical portion and having the nozzle holes. The tip portion includes a thin region having a thickness T satisfying T<L where L is a length of each nozzle hole.

9 Claims, 12 Drawing Sheets

(56) References Cited

U.S. PATENT DOCUMENTS

| | | | |
|---|---|---|---|
| 2014/0083391 A1 | 3/2014 | Gruber | |
| 2015/0083070 A1* | 3/2015 | Becker | F02F 1/40 123/254 |
| 2016/0053673 A1* | 2/2016 | Sotiropoulou | F02B 19/18 123/260 |
| 2016/0326946 A1 | 11/2016 | Willi | |
| 2021/0207523 A1* | 7/2021 | Guisasola | F02B 19/1023 |

FOREIGN PATENT DOCUMENTS

| | | |
|---|---|---|
| JP | 59-49720 U | 4/1984 |
| JP | 5-504185 A | 7/1993 |
| JP | 7-127529 A | 5/1995 |
| JP | 2003-254195 A | 9/2003 |
| JP | 2007-113536 A | 5/2007 |
| JP | 5357926 B2 | 12/2013 |
| JP | 2014-66245 A | 4/2014 |
| WO | WO 91/12418 A1 | 8/1991 |
| WO | WO 2011/080917 A1 | 7/2011 |
| WO | WO 2019/228665 A1 | 12/2019 |

OTHER PUBLICATIONS

International Search Report for International Application PCT/JP2018/031833, dated Nov. 6, 2018.
Office Action dated Apr. 13, 2021 issued in counterpart Japanese Application No. 2017-190263 with an English Translation.
Extended European Search Report dated Jun. 19, 2020 issued to the corresponding European Application No. 18861842.5.

* cited by examiner

FIG. 11

|  | Dimensionless strain range (-) | | |
| --- | --- | --- | --- |
|  | P1 | P2 | P3 |
| 3F | 1 | 1 | 1 |
| 3A | 1 | 0.875 | 1 |
| Reduction rate (%) |  | △12.5 |  |

FIG. 12

|  | Dimensionless strain range (-) | | |
| --- | --- | --- | --- |
|  | P1 | P2 | P3 |
| 3F | 1 | 1 | 1 |
| 3E | 0.690 | 0.795 | 0.718 |
| Reduction rate (%) | △31.0 | △20.5 | △28.2 |

PRECOMBUSTION CHAMBER GAS ENGINE

TECHNICAL FIELD

The present disclosure relates to a precombustion chamber gas engine for combusting an air-fuel mixture in a main combustion chamber by injecting a plurality of combustion flames generated in a precombustion chamber via a plurality of nozzle holes to the main combustion chamber.

BACKGROUND

Conventionally, a precombustion chamber gas engine including a main combustion chamber (main chamber) defined between a piston and a cylinder head and a precombustion chamber (auxiliary chamber) communicating with the main combustion chamber via a plurality of nozzle holes is known (for example, Patent Document 1). The precombustion chamber gas engine ignites an air-fuel mixture in the precombustion chamber by an ignition device such as an ignition plug, and jets combustion flames generated by the ignition via each of the nozzle holes disposed at the tip of the precombustion chamber, by which a lean premixed gas in the main combustion chamber is combusted.

Patent Document 1 discloses that the inner wall of the precombustion chamber expands with increasing (raising) temperature of the inner wall to about 1000° C., and the expanded inner wall contracts with decreasing temperature, and that the repeated expansion and contraction of the inner wall of the precombustion chamber causes heat fatigue, which may cause a crack in the inner wall. Further, Patent Document 1 discloses that the crack often occurs in the vicinity of the precombustion-chamber-side opening edge of the nozzle hole.

To solve the above problem, in Patent Document 1, on the basis of findings that the crack in the vicinity of the precombustion-chamber-side opening edge is caused due to temperature of the precombustion-chamber-side opening edge significantly raised compared to the surrounding portion, the precombustion-chamber-side opening edge of the nozzle hole is formed with a curved surface having a certain curvature radius to reduce the temperature difference between the opening edge and the surrounding portion.

CITATION LIST

Patent Literature

Patent Document 1: JP5357926B

SUMMARY

Problems to be Solved

Indeed, in Patent Document 1, the occurrence of crack at the precombustion-chamber-side opening edge is suppressed compared to when the precombustion-chamber-side opening edge is not formed with a curved surface, but the effect obtained by forming the curved surface is limited, and a further measure is necessary to further suppress the occurrence of crack.

In view of the above circumstances, an object of at least one embodiment of the present invention is to provide a precombustion chamber gas engine that can reduce thermal stress generated around nozzle holes and suppress the occurrence of crack around the nozzle holes.

Solution to the Problems (1) A precombustion chamber gas engine according to at least one embodiment of the present invention comprises: a main-chamber forming portion forming a main combustion chamber; and a precombustion-chamber forming portion forming a precombustion chamber communicating with the main combustion chamber via a plurality of nozzle holes. The precombustion-chamber forming portion includes a cylindrical portion extending along an extension direction of a precombustion chamber central axis of the precombustion-chamber forming portion, and a tip portion closing a main-combustion-chamber-side end of the cylindrical portion and having the nozzle holes. The tip portion includes a thin region having a thickness T satisfying $T<L$ where L is a length of each nozzle hole.

According to the above configuration (1), the tip portion of the precombustion-chamber forming portion has a thin region having a thickness T satisfying $T<L$, where L is the length of the nozzle hole. Since the tip portion has a plurality of nozzle holes, the thin region is formed around the nozzle holes. When such a thin region is formed around the nozzle holes of the tip portion, which are largely affected by heat of the combustion flame, it is possible to reduce the heat capacity and stiffness around the nozzle holes, and it is possible to flatten the temperature distribution (temperature difference) around the nozzle holes at temperature rise. Reducing the heat capacity and stiffness around the nozzle holes facilitates thermal deformation (thermal expansion and thermal contraction) around the nozzle holes, thus reducing thermal strain around the nozzle holes and thermal stress generated due to confinement of the thermal strain. Further, flattening the temperature distribution around the nozzle holes at temperature rise suppresses non-uniform thermal deformation around the nozzle holes, thus reducing thermal strain around the nozzle holes and thermal stress generated due to confinement of the thermal strain. Consequently, it is possible to suppress the occurrence of crack around the nozzle holes due to heat fatigue.

(2) A precombustion chamber gas engine according to at least one embodiment of the present invention comprises: a main-chamber forming portion forming a main combustion chamber; and a precombustion-chamber forming portion forming a precombustion chamber communicating with the main combustion chamber via a plurality of nozzle holes. The precombustion-chamber forming portion includes a cylindrical portion extending along an extension direction of a precombustion chamber central axis of the precombustion-chamber forming portion, and a tip portion closing a main-combustion-chamber-side end of the cylindrical portion and having the nozzle holes. The tip portion is located on a main combustion chamber side of a reference plane that extends in a direction perpendicular to the precombustion chamber central axis at a position away from an upper edge of a precombustion-chamber-side opening of each nozzle hole by a length predetermined times a diameter of each nozzle hole in a direction opposite to the main combustion chamber along the extension direction of the precombustion chamber central axis. The tip portion includes a thin region having a thickness T satisfying $T<T0$ where $T0$ is a thickness of the precombustion-chamber forming portion at the reference plane.

According to the above configuration (2), the tip portion of the precombustion-chamber forming portion is located on the main combustion chamber side of the reference plane that extends in a direction perpendicular to the precombustion chamber central axis at a position away from the upper edge of the precombustion-chamber-side opening of each nozzle hole by a length predetermined times, e.g., three times, the diameter of each nozzle hole in a direction opposite to the main combustion chamber along the extension direction of the precombustion chamber central axis. Further, the tip portion has a thin region having a thickness T satisfying T<T0, where T0 is the thickness of the precombustion-chamber forming portion at the reference plane. In other words, the thickness of the thin region is less than that at the reference plane which is less affected by the combustion flame. When such a thin region is formed around the nozzle holes of the tip portion, which are largely affected by heat of the combustion flame, it is possible to reduce the heat capacity and stiffness around the nozzle holes, and it is possible to flatten the temperature distribution (temperature difference) around the nozzle holes at temperature rise. Reducing the heat capacity and stiffness around the nozzle holes facilitates thermal deformation (thermal expansion and thermal contraction) around the nozzle holes, thus reducing thermal strain around the nozzle holes and thermal stress generated due to confinement of the thermal strain. Further, flattening the temperature distribution around the nozzle holes at temperature rise suppresses non-uniform thermal deformation around the nozzle holes, thus reducing thermal strain around the nozzle holes and thermal stress generated due to confinement of the thermal strain. Consequently, it is possible to suppress the occurrence of crack around the nozzle holes due to heat fatigue.

(3) In some embodiments, in the above configuration (1), the thin region includes a tip of the tip portion.

With the above configuration (3), since the thin region includes the tip of the tip portion, the thickness of the tip of the tip portion is reduced compared to when the thin region is not present in the tip of the tip portion. Thus, the heat capacity and stiffness around the nozzle holes are reduced, and the temperature distribution around the nozzle holes at temperature rise is flattened. As a result, it is possible to suppress the occurrence of crack around the nozzle holes due to heat fatigue.

(4) In some embodiments, in the above configuration (2), the thin region includes a tip of the tip portion.

With the above configuration (4), since the thin region includes the tip of the tip portion, the thickness of the tip of the tip portion is reduced compared to when the thin region is not present in the tip of the tip portion. Thus, the heat capacity and stiffness around the nozzle holes are reduced, and the temperature distribution around the nozzle holes at temperature rise is flattened. As a result, it is possible to suppress the occurrence of crack around the nozzle holes due to heat fatigue.

In some embodiments, in the above configuration (2) or (4), the thin region includes at least a part of a peripheral edge of a main-combustion-side opening of each nozzle hole in the tip portion.

With the above configuration (5), since the thin region includes at least a part of the peripheral edge of the main-combustion-chamber-side opening of the nozzle hole in the tip portion, the thickness around the nozzle holes is reduced. Thus, the heat capacity and stiffness around the nozzle holes are reduced, and the temperature distribution around the nozzle holes at temperature rise is flattened. As a result, it is possible to suppress the occurrence of crack around the nozzle holes due to heat fatigue.

(6) In some embodiments, in any one of the above configurations (1) to (5), the thin region includes a portion of the tip portion between a pair of nozzle holes adjacent each other in a circumferential direction of the tip portion.

With the above configuration (6), since the thin region includes a portion of the tip portion between a pair of nozzle holes adjacent in the circumferential direction of the tip portion, the thickness of the portion between the pair of circumferentially adjacent nozzle holes is reduced. Thus, the heat capacity and stiffness around the pair of nozzle holes are reduced, and the temperature distribution around the pair of nozzle holes at temperature rise is flattened. As a result, it is possible to suppress the occurrence of crack around the nozzle holes due to heat fatigue.

(7) In some embodiments, in the above configuration (6), the thin region includes at least one outer recess formed in an outer peripheral surface of the tip portion facing the main combustion chamber.

According to the above configuration (7), the thin region includes at least one outer recess formed in an outer peripheral surface of the tip portion facing the main combustion chamber. In other words, since the thin region is defined by the at least one outer recess formed in the outer peripheral surface of the tip portion, it is possible to reduce thermal strain around the main-combustion-chamber-side openings of the nozzle holes and thermal stress generated due to confinement of the thermal strain.

In some embodiments, in the above configuration (6) or (7), the thin region includes at least one inner recess formed in an inner peripheral surface of the tip portion facing the precombustion chamber.

According to the above configuration (8), the thin region includes at least one inner recess formed in an inner peripheral surface of the tip portion facing the precombustion chamber. In other words, since the thin region is defined by the at least one inner recess formed in the inner peripheral surface of the tip portion, it is possible to reduce thermal strain around the precombustion-chamber-side openings of the nozzle holes and thermal stress generated due to confinement of the thermal strain.

Advantageous Effects

At least one embodiment of the present invention provides a precombustion chamber gas engine that can reduce thermal stress generated around the nozzle hole and suppress the occurrence of crack around the nozzle hole.

BRIEF DESCRIPTION OF DRAWINGS

FIG. 11 is a table showing a dimensionless strain range of a precombustion-chamber-side opening of a precombustion-chamber forming portion having a first thin region, compared to a precombustion-chamber forming portion not having the thin region.

FIG. 12 is a table showing a dimensionless strain range of a precombustion-chamber-side opening of a precombustion-chamber forming portion having a first thin region, a third thin region, and a chamfered shape on the edge of the precombustion-chamber-side opening, compared to a precombustion-chamber forming portion not having the thin region.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
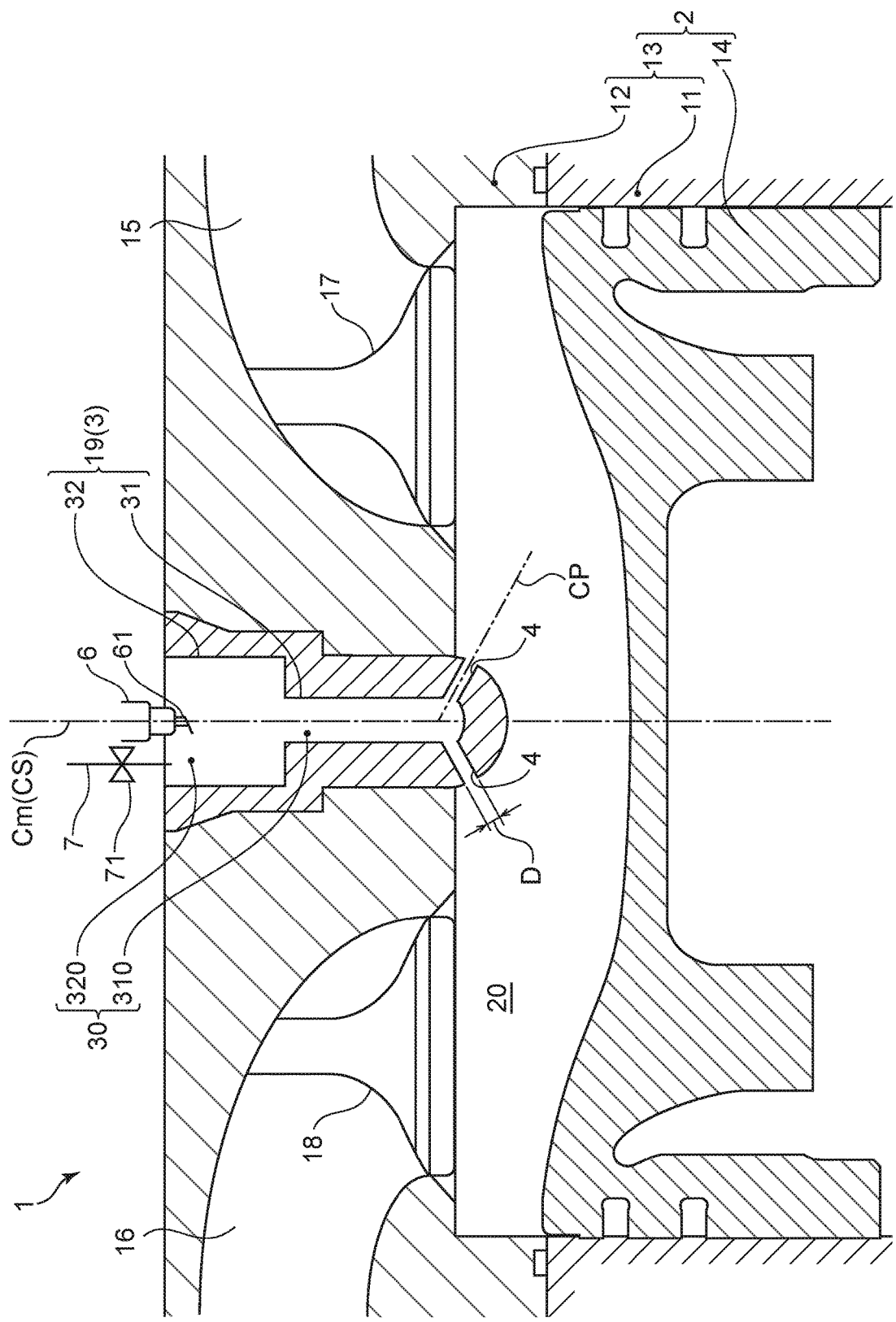
FIG. 1 is a schematic cross-sectional view of a precombustion chamber gas engine according to an embodiment of the present invention.

FIG. 1 is a schematic cross-sectional view of a precombustion chamber gas engine according to an embodiment of the present invention. As shown in FIG. 1, the precombustion chamber gas engine 1 according to some embodiments includes a main-chamber forming portion 2 forming a main combustion chamber 20 (main chamber) of the engine, and a precombustion-chamber forming portion 3 forming a precombustion chamber 30 communicating with the main combustion chamber 20 via a plurality of nozzle holes 4.

As shown in FIG. 1, the precombustion chamber gas engine 1 includes: a cylinder 13 including a cylinder block 11 having therein a tubular structure of cylindrical shape and a cylinder head 12 having therein a recessed structure capable of capping the top of the tubular structure; a piston 14 reciprocably disposed within the cylinder 13; and a precombustion chamber cap 19 made of nickel-based alloy, for example. The main combustion chamber 20 is defined between the cylinder 13 and the piston 14. The precombustion chamber 30 is defined by the precombustion chamber cap 19 disposed on the cylinder head 12 so as to be positioned above the main combustion chamber 20 (on the opposite side from the piston 14). In other words, the cylinder 13 and the piston 14 form the main-chamber forming portion 2, and the precombustion chamber cap 19 forms the precombustion-chamber forming portion 3.

As shown in FIG. 1, the precombustion-chamber forming portion 3 includes a plurality of nozzle holes 4 connecting the precombustion chamber 30 formed in the precombustion-chamber forming portion 3 to the outside. The main combustion chamber 20 communicates with the precombustion chamber 30 via the plurality of nozzle holes 4.

Further, as shown in FIG. 1, the precombustion-chamber forming portion 3 includes a small-diameter-cylinder forming portion 31 which forms a small-diameter cylinder chamber 310 of cylindrical shape having a predetermined inner diameter and connected to the plurality of nozzle holes 4 and a large-diameter-cylinder forming portion 32 which forms a large-diameter cylinder chamber 320 of cylindrical shape having an inner diameter larger than that of the small-diameter cylinder chamber 310. That is, the precombustion chamber 30 includes the small-diameter cylinder chamber 310 and the large-diameter cylinder chamber 320. The precombustion chamber 30 may have other shape, for example, a cylindrical shape having a constant inner diameter.

As shown in FIG. 1, the precombustion chamber central axis CS coincides with the central axis of the small-diameter cylinder chamber 310. Although in the embodiment shown in FIG. 1, the main chamber central axis CM coincides with the precombustion chamber central axis CS, the precombustion chamber central axis CS may be inclined with respect to the main chamber central axis CM. Further, the central axis of the small-diameter cylinder chamber 310 may not coincide with the central axis of the large-diameter cylinder chamber 320.

In the embodiment shown in FIG. 1, the precombustion chamber gas engine 1 further includes an ignition device 6 disposed in the large-diameter cylinder chamber 320 of the precombustion chamber 30, and a precombustion-chamber-gas supply device 7 for directly supplying a precombustion chamber fuel gas to the precombustion chamber 30 not via the main combustion chamber 20. The ignition device 6 has an ignition portion 61 capable of igniting an air-fuel mixture. As shown in FIG. 1, the ignition device 6 is an ignition plug, and the ignition device 6 is mounted on the engine so that an electrode (ignition portion 61) of the ignition plug is positioned on the precombustion chamber central axis CS. The ignition device 6 may be disposed such that the ignition portion 61 is at a predetermined distance from the precombustion chamber central axis CS. As shown in FIG. 1, the precombustion-chamber-gas supply device 7 is configured to supply a precombustion chamber fuel gas to the large-diameter cylinder chamber 320, and the supply of the precombustion chamber fuel gas to the precombustion chamber 30 is controlled by a precombustion-chamber-fuel-gas supply valve 71.

In the embodiment shown in FIG. 1, the precombustion chamber gas engine 1 further includes an intake port 15 and an exhaust port 16 connected around the cylinder head 12; an intake valve 17 for opening and closing the intake port 15; and an exhaust valve 18 for opening and closing the exhaust port 16.

The precombustion chamber gas engine 1 having the above configuration opens the intake valve 17 and closes the exhaust valve 18 when the piston 14 moves downward in the intake stroke, for instance. As the intake valve 17 opens, a lean premixed gas containing fuel gas and air is introduced into the cylinder 13 through the intake port 15 connected to the intake valve 17. Further, as the precombustion-chamber-fuel-gas supply valve 71 opens, the precombustion chamber fuel gas is introduced into the precombustion chamber 30. Meanwhile, in the compression stroke, the precombustion-chamber-fuel-gas supply valve 71 closes when the piston 14 moves upward. Further, the lean premixed gas introduced into the cylinder 13 through the intake port 15 is compressed as the piston 14 moves upward, and a part of the lean premixed gas is introduced into the precombustion chamber 30 through each of the nozzle holes 4 of the precombustion chamber 30. In the combustion stroke, the lean premixed gas introduced from the main combustion chamber 20 to the precombustion chamber 30 is mixed with the precombustion chamber fuel gas to produce an air-fuel mixture having a concentration suitable for ignition in the precombustion chamber 30. The air-fuel mixture in the precombustion chamber 30 is ignited by the ignition device 6 at a predetermined timing when the piston 14 arrives at the vicinity of the compression top dead center, so that the air-fuel mixture in the precombustion chamber 30 is combusted. Combustion flames generated by this combustion is injected into the cylinder 13 through each of the nozzle holes and ignite the lean premixed gas in the cylinder 13, which leads to combustion of the lean premixed gas in the main combustion chamber 20.

In the precombustion chamber gas engine 1, for example, in the combustion stroke, rapid temperature change occurs in the inner wall of the precombustion-chamber forming portion 3 and the nozzle holes 4, such as rapid temperature increase of the inner wall of the precombustion-chamber forming portion 3 and the nozzle holes 4 when the combustion flames are injected into the cylinder 13 from the nozzle holes 4, which may cause a crack in the inner wall of the precombustion-chamber forming portion 3 and the nozzle holes 4. The present inventors have found that, as described later, when the precombustion-chamber forming portion 3 has a thin region 5 or a thin region 8 to reduce the heat capacity and stiffness around the nozzle holes 4 and to flatten the temperature distribution (temperature difference) around the nozzle holes, it is possible to reduce thermal stress around the nozzle holes 4, and suppress the occurrence of crack around the nozzle holes 4.

Hereinafter, a configuration of the precombustion-chamber forming portion 3 of the precombustion chamber gas engine 1 will be described.

Figure 2:
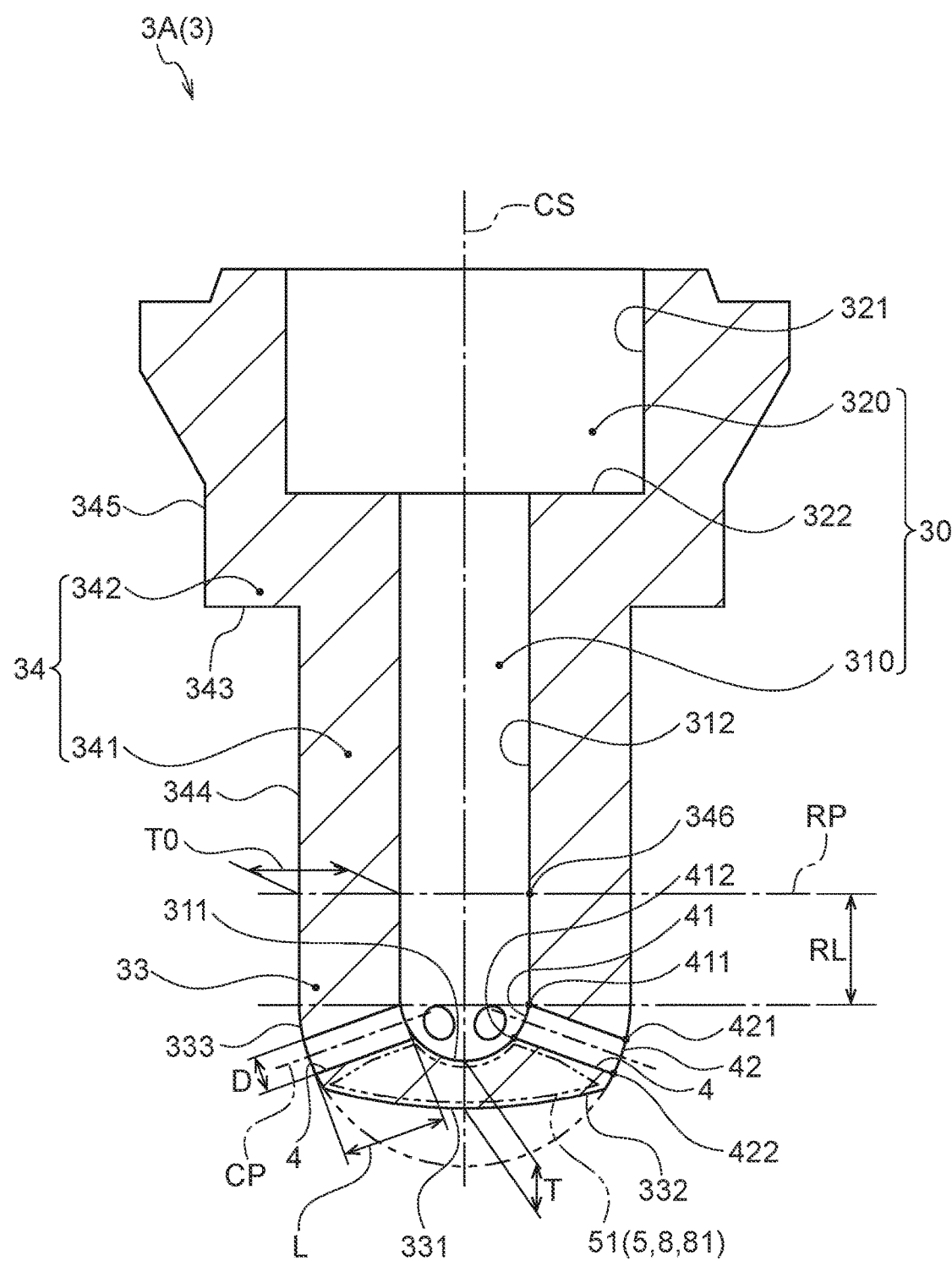
FIG. 2 is a schematic cross-sectional view of a precombustion-chamber forming portion according to an embodiment.
Figure 3:
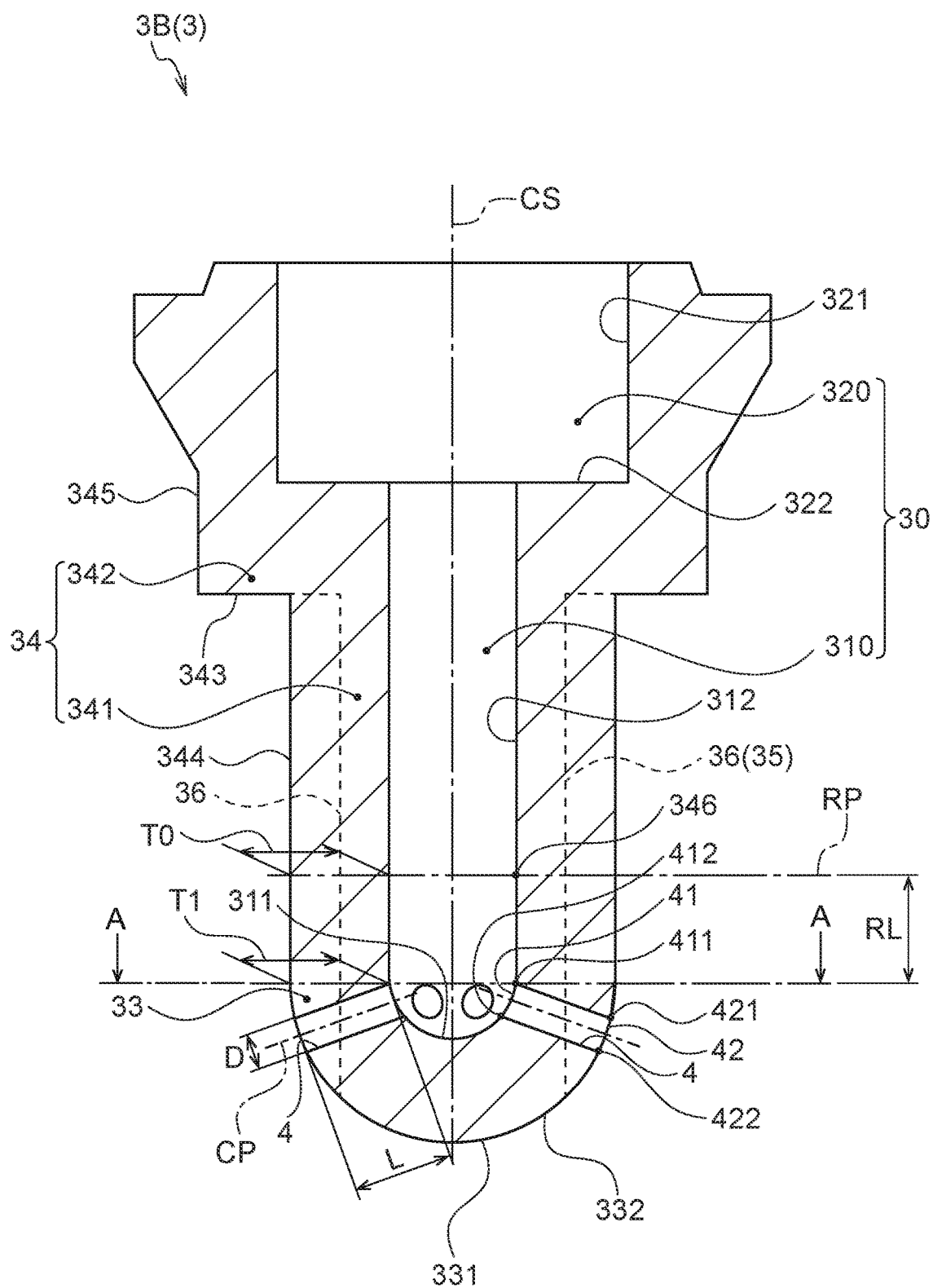
FIG. 3 is a schematic cross-sectional view of a precombustion-chamber forming portion according to another embodiment for describing an outer recess formed in an outer peripheral surface of a tip portion facing a main combustion chamber.
Figure 4:
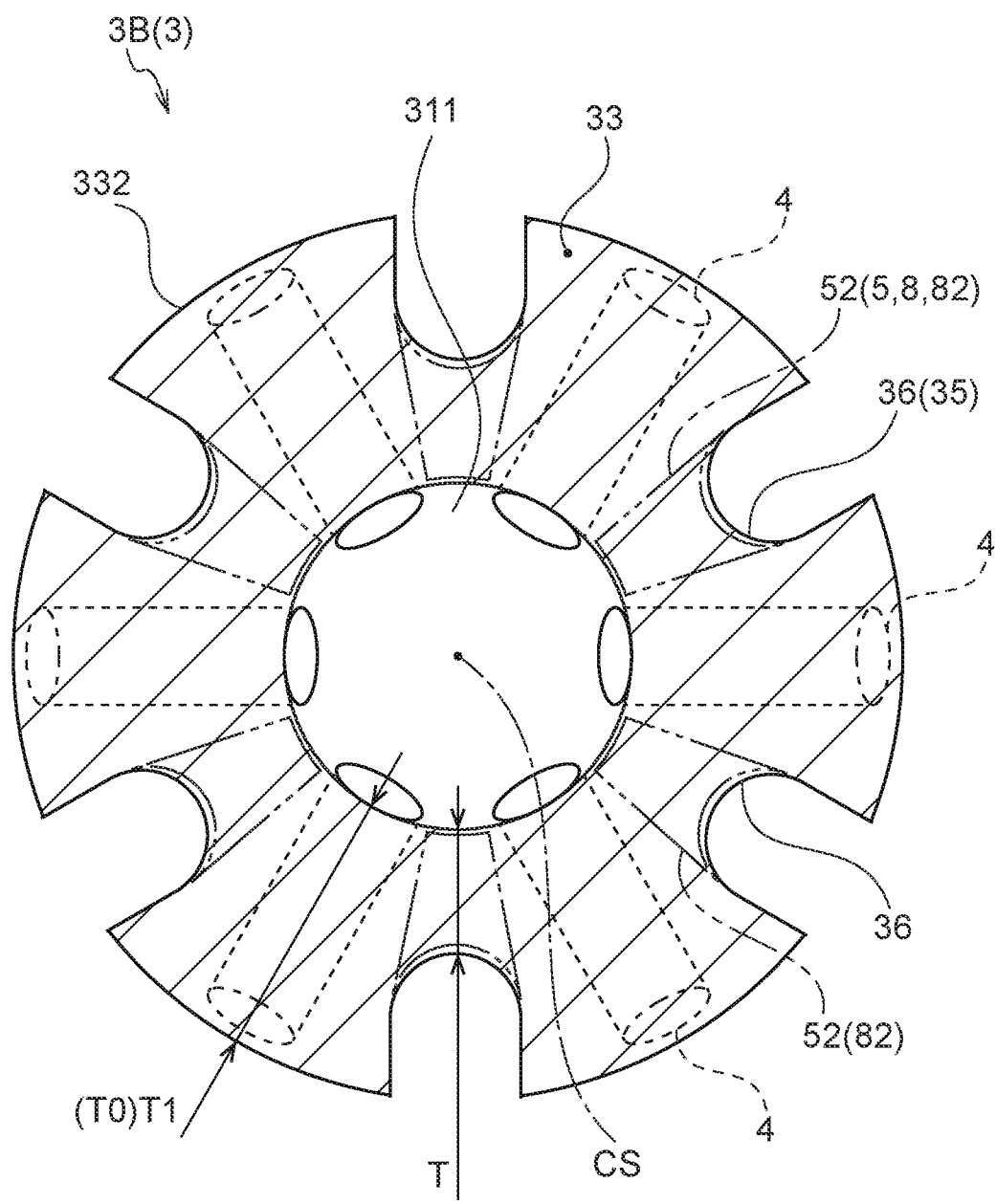
FIG. 4 is a schematic cross-sectional view taken along line A-A in FIG. 3.
Figure 5:
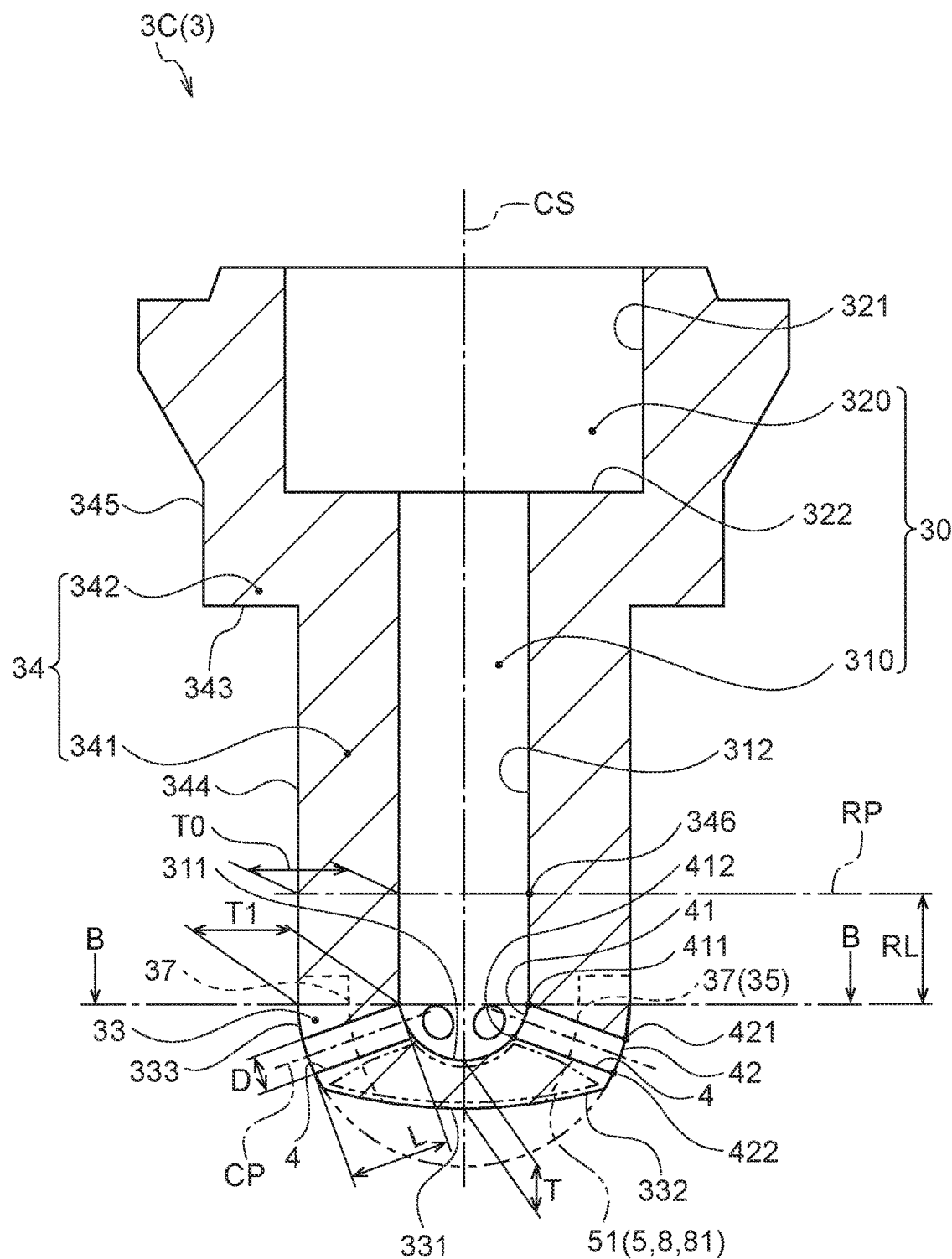
FIG. 5 is a schematic cross-sectional view of a precombustion-chamber forming portion according to another embodiment for describing a thin region formed in a tip portion.
Figure 6:
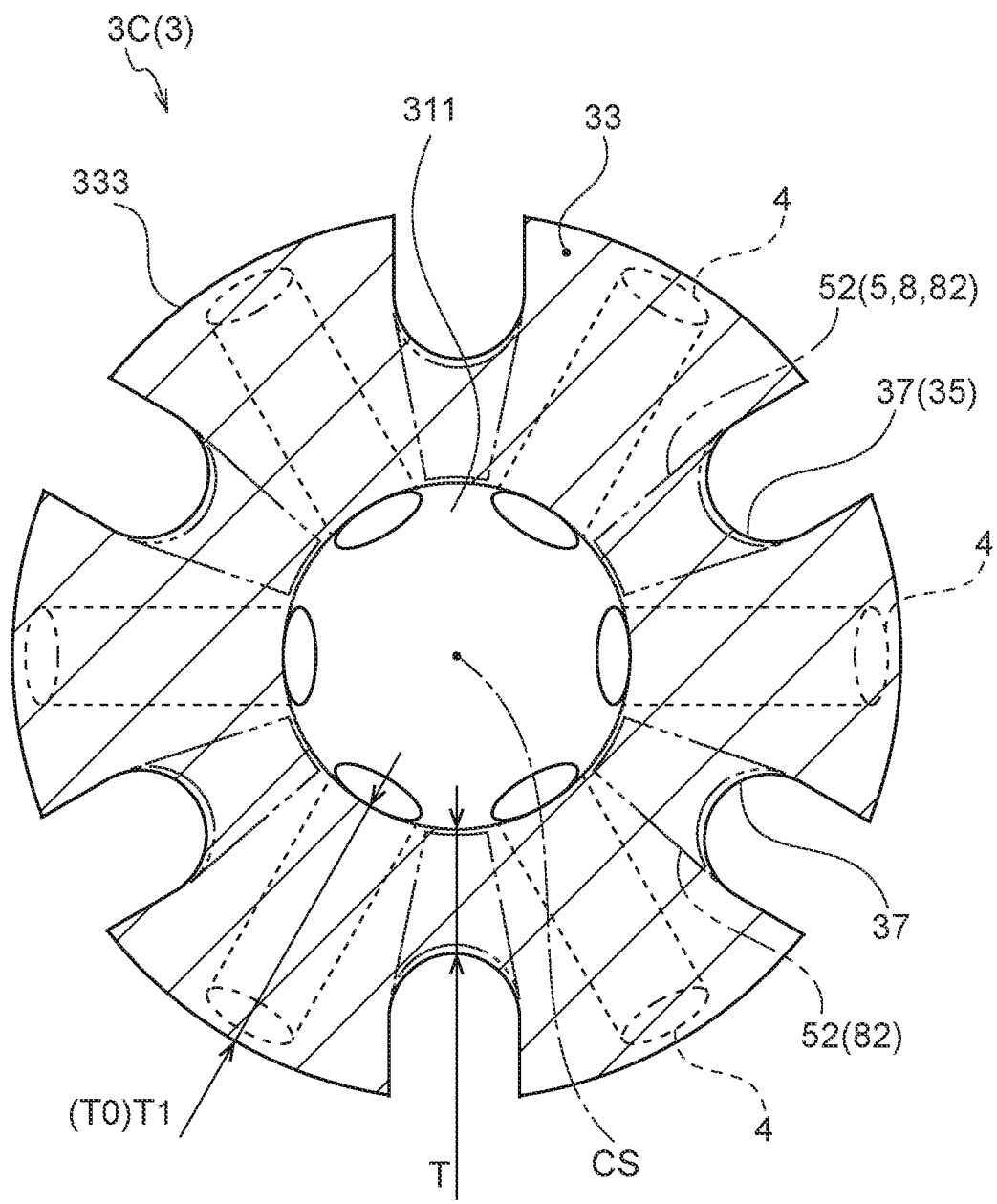
FIG. 6 is a schematic cross-sectional view taken along line B-B in FIG. 5.
Figure 7:
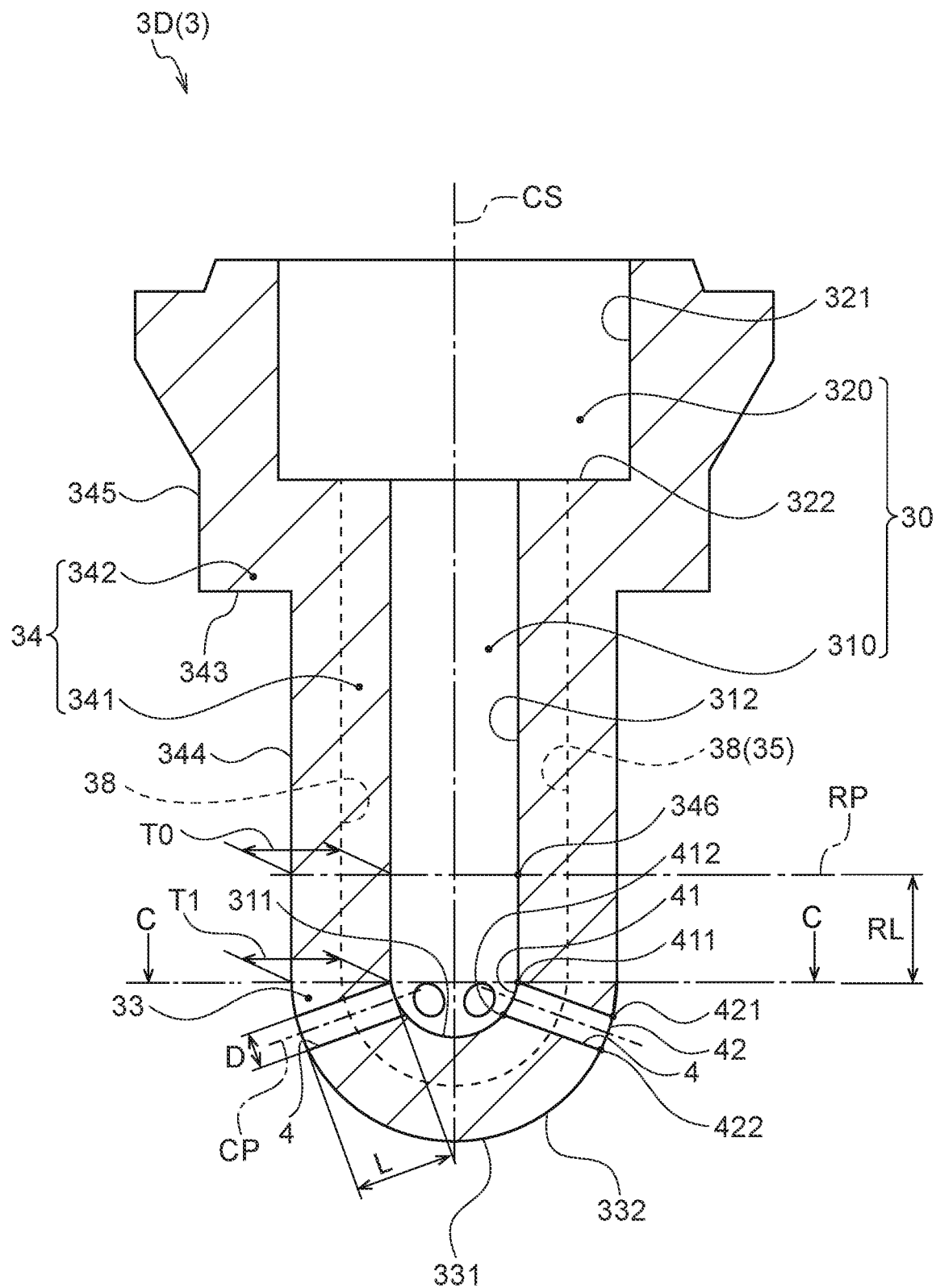
FIG. 7 is a schematic cross-sectional view of a precombustion-chamber forming portion according to another embodiment for describing an inner recess formed in an inner peripheral surface of a tip portion facing a precombustion chamber.
Figure 8:
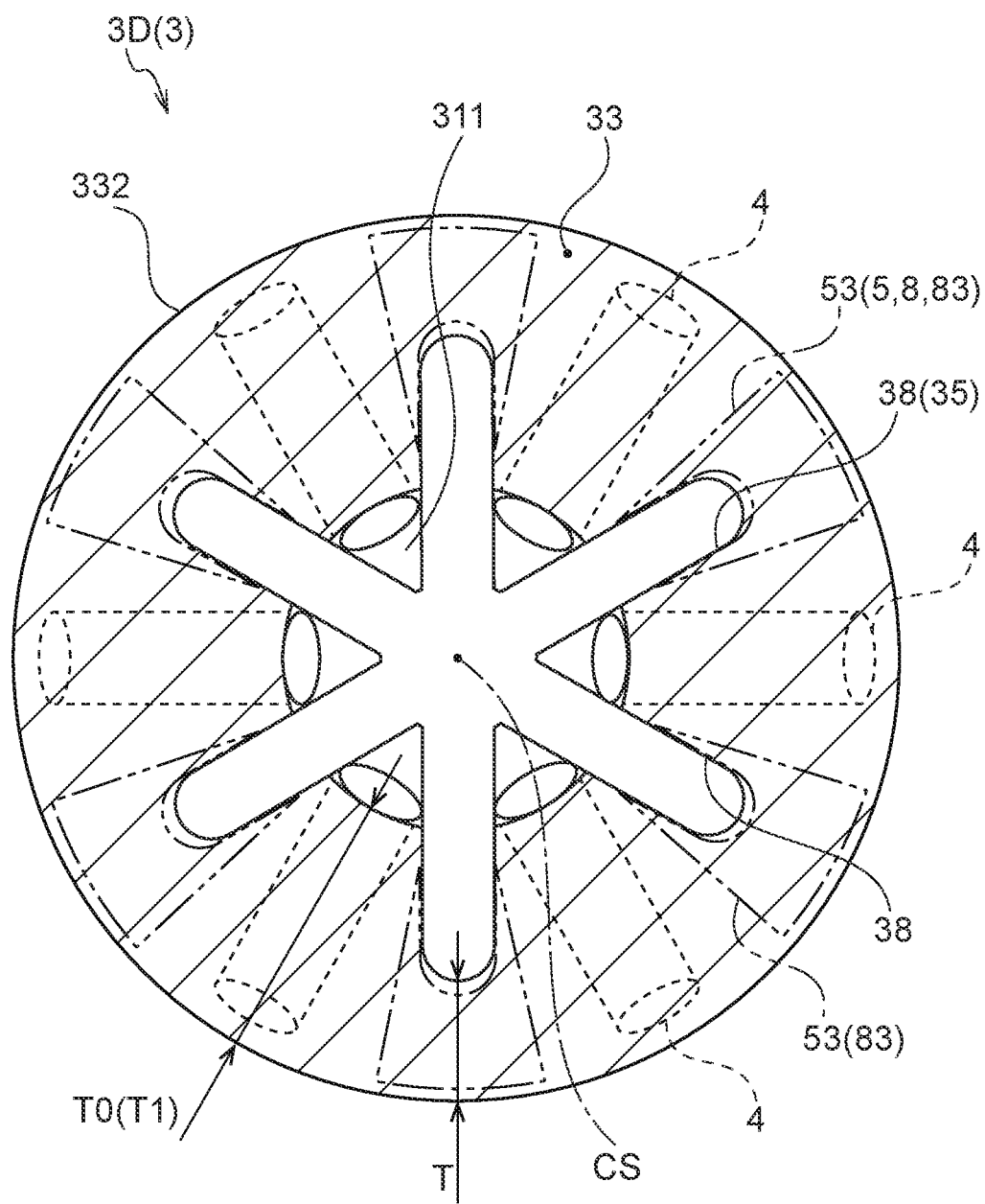
FIG. 8 is a schematic cross-sectional view taken along line C-C in FIG. 7.

FIGS. 2, 3, 5, and 7 are each a schematic cross-sectional view of a precombustion-chamber forming portion according to an embodiment. FIG. 3 is a diagram for describing an outer recess formed in an outer peripheral surface of a tip portion facing a main combustion chamber. FIG. 4 is a schematic cross-sectional view taken along line A-A in FIG. 3. FIG. 5 is a diagram for describing a thin region formed in a tip portion. FIG. 6 is a schematic cross-sectional view taken along line B-B in FIG. 5. FIG. 7 is a diagram for describing an inner recess formed in an inner peripheral surface of a tip portion facing a precombustion chamber. FIG. 8 is a schematic cross-sectional view taken along line C-C in FIG. 7. The line A-A in FIG. 3, the line B-B in FIG. 5, and the line C-C in FIG. 7 pass through an upper edge 411 of a precombustion-chamber-side opening 41 of the nozzle hole 4 and extend in a direction perpendicular to the precombustion chamber central axis CS.

As shown in FIGS. 2, 3, 5, and 7, the precombustion-chamber forming portion 3 of the precombustion chamber gas engine 1 according to some embodiments includes a cylindrical portion 34 extending along the extension direction (vertical direction in the figures) of the precombustion chamber central axis CS of the precombustion-chamber forming portion 3, and a tip portion 33 closing one end (lower end) of the cylindrical portion 34 closer to the main combustion chamber 20. As shown in FIGS. 2, 3, 5, and 7, the cylindrical portion 34 includes a small-diameter cylindrical portion 341 of cylindrical shape and a large-diameter cylindrical portion 342 of cylindrical shape having a larger outer diameter than the small-diameter cylindrical portion 341. A stepped surface 343 is formed between an outer peripheral surface 344 of the small-diameter cylindrical portion 341 and an outer peripheral surface 345 of the large-diameter cylindrical portion 342. The stepped surface 343 of the cylindrical portion 34 abuts on an unillustrated portion of the cylinder head 12, or is in contact with the cylinder head 12 via an unillustrated component such as a seal member so that the precombustion-chamber forming portion 3 is supported by the cylinder head 12. Further, the large-diameter cylinder chamber 320 of the precombustion-chamber forming portion 3 is formed in cylindrical shape having a constant internal diameter, and a stepped surface 322 is formed between a wall surface 321 of the large-diameter cylinder chamber 320 and a wall surface 312 of the small-diameter cylinder chamber 310.

As shown in FIGS. 2, 3, 5, and 7, the tip portion 33 has a plurality of nozzle holes 4 whose central axes CP are inclined with respect to the precombustion chamber central axis CS. As shown in FIGS. 2, 3, 5, and 7, D represents the nozzle hole diameter, and L represents the nozzle hole length of the nozzle hole 4. The nozzle hole diameter D and the nozzle hole length L are determined by the combustion performance of the precombustion chamber gas engine 1 and the internal pressure of the precombustion-chamber forming portion 3. The nozzle holes 4 are arranged at intervals in the circumferential direction, as shown in FIGS. 4, 6, and 8.

As shown in FIGS. 2, 3, 5, and 7, the tip portion 33 is formed integrally with a lower end of the small-diameter cylindrical portion 341 opposite to an upper end that is formed integrally with the large-diameter cylindrical portion 342. As shown in FIGS. 2, 3, 5, and 7, the tip portion 33 protrudes from the lower end of the small-diameter cylindrical portion 341 and has a convex tip surface 332. Alternatively, the tip portion 33 may be recessed inward from the lower end of the small-diameter cylindrical portion 341 and has a concave tip surface. Alternatively, the tip portion 33 may be formed so as to extend along a direction perpendicular to the extension direction of the precombustion chamber central axis CS and has a flat tip surface.

As shown in FIGS. 2, 4 to 6, and 8, the tip portion 33 has a thin region 5 having a thickness T satisfying T<L, where L is the length of the nozzle hole 4.

According to the above configuration, the tip portion 33 of the precombustion-chamber forming portion 3 has the thin region 5 having a thickness T satisfying T<L, where L is the length of the nozzle hole 4. Since the tip portion 33 has the plurality of nozzle holes 4, the thin region 5 is formed around the nozzle holes 4. When such a thin region 5 is formed around the nozzle holes 4 of the tip portion 33, which are largely affected by heat of the combustion flame, it is possible to reduce the heat capacity and stiffness around the nozzle holes 4, and it is possible to flatten the temperature distribution (temperature difference) around the nozzle holes 4 at temperature rise. Reducing the heat capacity and stiffness around the nozzle holes 4 facilitates thermal deformation (thermal expansion and thermal contraction) around the nozzle holes 4, thus reducing thermal strain around the nozzle holes 4 and thermal stress generated due to confinement of the thermal strain. Further, flattening the temperature distribution around the nozzle holes 4 at temperature rise suppresses non-uniform thermal deformation around the nozzle holes 4, thus reducing thermal strain around the nozzle holes 4 and thermal stress generated due to confinement of the thermal strain. Consequently, it is possible to suppress the occurrence of crack around the nozzle holes 4 due to heat fatigue.

In some embodiments, as shown in FIGS. 2 and 5, the thin region 5 includes a tip 331 of the tip portion 33. As shown in FIGS. 2 and 5, the tip 331 of the tip portion 33 is an end opposite to an end integrally connected with the cylindrical portion 34 with respect to the extension direction of the precombustion chamber central axis CS.

In the embodiments shown in FIGS. 2 and 5, the precombustion-chamber forming portion 3 includes a precombustion-chamber forming portion 3A, 3C having the thin region 5 including a first thin region 51. As shown in FIGS. 2 and 5, the tip portion 33 of the precombustion-chamber forming portion 3A, 3C has a thickness gradually decreasing toward the tip 331 in a region from a lower edge 422 of a main-combustion-chamber-side opening 42 of the nozzle hole 4 to the tip 331 in the extension direction of the precombustion chamber central axis CS. In the vicinity of the tip 331 of the tip portion 33 of the precombustion-chamber forming portion 3A, 3C, a tip surface 332 is formed which has a smaller curvature than an outer peripheral surface 333 forming an outer periphery of a portion whose thickness is equal to the nozzle hole length L. Accordingly, the thickness T of a portion where the tip surface 332 of the tip portion 33 forms the outer periphery is smaller than the nozzle hole length L of the nozzle hole 4. As shown in FIGS. 2 and 5, the first thin region 51 is formed from the tip 331 to a lower side of a lower edge 412 of the precombustion-chamber-side opening 41 in the extension direction of the precombustion chamber central axis CS. The first thin region 51 does not include the peripheral edge of the nozzle hole 4, i.e., the precombustion-chamber-side opening 41 and the main-combustion-chamber-side opening 42 of the nozzle hole 4.

With the above configuration, since the thin region 5 (first thin region 51) includes the tip 331 of the tip portion 33, the thickness of the tip 331 of the tip portion 33 is reduced compared to when the thin region 5 is not present in the tip 331 of the tip portion 33. Thus, the heat capacity and stiffness around the nozzle holes 4 are reduced, and the temperature distribution around the nozzle holes 4 at temperature rise is flattened. As a result, it is possible to suppress the occurrence of crack around the nozzle holes 4 due to heat fatigue. Incidentally, the thin region 5 including the tip 331 of the tip portion 33 can be easily formed in the precombustion-chamber forming portion 3 having no thin region 5 in the tip 331 of the tip portion 33, by cutting or the like.

In some embodiments, as shown in FIGS. 4, 6, and 8, the thin region 5 (second thin region 52, third thin region 53) includes a portion of the tip portion 33 between a pair of nozzle holes 4 adjacent in the circumferential direction of the tip portion 33. In the embodiments shown in FIGS. 2 to 8, the thickness T1 of a part of the precombustion-chamber forming portion 3 in the circumferential direction in a plane passing through the upper edge 411 of the precombustion-chamber-side opening 41 of the nozzle hole 4 and extending in a direction perpendicular to the precombustion chamber central axis CS is equal to the nozzle hole length L of the nozzle hole 4. In the embodiment shown in FIGS. 3 and 4, the precombustion-chamber forming portion 3 includes a precombustion-chamber forming portion 3B having the thin region 5 including a second thin region 52. In the embodiment shown in FIGS. 5 and 6, the precombustion-chamber forming portion 3C has the thin region 5 including, in addition to the first thin region 51 described above, the second thin region 52. As shown in FIGS. 4 and 6, the second thin region 52 is formed in the tip portion 33 between each pair of nozzle holes 4 adjacent in the circumferential direction of the tip portion 33. In the embodiment shown in FIGS. 7 and 8, the precombustion-chamber forming portion 3 includes a precombustion-chamber forming portion 3D having the thin region 5 including a third thin region 53. As shown in FIGS. 7 and 8, the third thin region 53 is formed in the tip portion 33 between each pair of nozzle holes 4 adjacent in the circumferential direction of the tip portion 33.

With the above configuration, since the thin region 5 (second thin region 52, third thin region 53) includes a portion of the tip portion 33 between a pair of nozzle holes 4 adjacent in the circumferential direction of the tip portion 33, the thickness of the portion between the pair of circumferentially adjacent nozzle holes 4 is reduced. Thus, the heat capacity and stiffness around the pair of nozzle holes 4 are reduced, and the temperature distribution around the pair of nozzle holes 4 at temperature rise is flattened. As a result, it is possible to suppress the occurrence of crack around the nozzle holes 4 due to heat fatigue.

In some embodiments, as shown in FIGS. 4 and 6, the second thin region 52 includes at least one outer recess 36, 37 (recess 35) formed in an outer peripheral surface (tip surface 332, outer peripheral surface 333) of the tip portion 33 facing the main combustion chamber 20. As shown in FIGS. 3 and 5, the outer recess 36, 37 is formed at least from the lower edge 422 of the main-combustion-chamber-side opening 42 to the upper edge 411 of the precombustion-chamber-side opening 41 in the extension direction of the precombustion chamber central axis CS. In the embodiments shown in FIGS. 4 and 6, a plurality of outer recesses 36, 37 are formed in the tip portion 33. The outer recesses 36, 37 are arranged at intervals in the circumferential direction of the tip portion 33, one between each pair of nozzle holes 4 adjacent in the circumferential direction of the tip portion 33.

In the embodiment shown in FIGS. 3 and 4, the precombustion-chamber forming portion 3B has a constant thickness in portions, not provided with the outer recess 36, 37, of the tip portion 33 and the cylindrical portion 34 from the stepped surface 343 to the tip portion 33 in the extension direction of the precombustion chamber central axis CS. As shown in FIG. 3, each outer recess 36 is shaped into a slit extending from the tip surface 332 of the tip portion 33 to the stepped surface 343 of the cylindrical portion 34 in the extension direction of the precombustion chamber central axis CS. The outer recesses 36 are recessed from the tip surface 332 of the tip portion 33 and the outer peripheral surface 344 of the small-diameter cylindrical portion 341 so as to have arc-shaped bottom surfaces on the inner side (a side facing the precombustion chamber 30). Accordingly, as shown in FIG. 4, the thickness T of a part of the tip portion 33 in the circumferential direction provided with the outer recess 36 is less than the thickness T1 of a remaining part in the circumferential direction not provided with the outer recess 36. Here, the thickness T1 is equal to the nozzle hole length L of the nozzle hole 4, as described above.

In the embodiment shown in FIGS. 5 and 6, the precombustion-chamber forming portion 3C has a constant thickness in portions, not provided with the outer recess 37, of the cylindrical portion 34 from the stepped surface 343 to the tip portion 33 in the extension direction of the precombustion chamber central axis CS and of the tip portion 33 including the lower edge 422 of the main-combustion-chamber-side opening 42 of the nozzle hole 4 and adjacent to the cylindrical portion 34. As shown in FIG. 5, each outer recess 37 is shaped into a slit extending from the tip surface 332 of the tip portion 33 to the lower end of the small-diameter cylindrical portion 341 in the extension direction of the precombustion chamber central axis CS. The outer recesses 37 are recessed from the outer peripheral surface 333 of the tip portion 33 and the outer peripheral surface 344 of the small-diameter cylindrical portion 341 so as to have a contact depth and an arc-shaped bottom surface on the inner side (a side facing the precombustion chamber 30). Accordingly, as shown in FIG. 6, the thickness T of a part of the tip portion 33 in the circumferential direction provided with the outer recess 37 is less than the thickness T1 of a remaining part in the circumferential direction not provided with the outer recess 37. Here, the thickness T1 is equal to the nozzle hole length L of the nozzle hole 4 as described above.

According to the above configuration, the thin region 5 (second thin region 52) includes at least one outer recess 36, 37 formed in an outer peripheral surface (tip surface 332, outer peripheral surface 333) of the tip portion 33 facing the main combustion chamber 20. In other words, since the thin region 5 is defined by the at least one outer recess 36, 37 formed in the outer peripheral surface of the tip portion 33, it is possible to reduce thermal strain around the main-combustion-chamber-side openings 42 of the nozzle holes 4 and thermal stress generated due to confinement of the thermal strain. Incidentally, the outer recess 36, 37 can be easily formed in the outer peripheral surface of the tip portion 33, by cutting or the like.

In some embodiments, as shown in FIGS. 7 and 8, the third thin region 53 includes at least one inner recess 38 (recess 35) formed in an inner peripheral surface (bottom surface 311, wall surface 312) of the tip portion 33 facing the precombustion chamber 30. As shown in FIG. 7, the inner recess 38 is formed at least from the lower edge 422 of the main-combustion-chamber-side opening 42 to the upper edge 411 of the precombustion-chamber-side opening 41 in the extension direction of the precombustion chamber central axis CS. In the embodiment shown in FIG. 8, a plurality of inner recesses 38 are formed in the tip portion 33. The inner recesses 38 are arranged at intervals in the circumferential direction of the tip portion 33, one between each pair of nozzle holes 4 adjacent in the circumferential direction of the tip portion 33.

In the embodiment shown in FIGS. 7 and 8, the precombustion-chamber forming portion 3D has a constant thickness in a portion, not provided with the inner recess 38, of the tip portion 33 and of the cylindrical portion 34 from the stepped surface 343 to the tip portion 33 in the extension direction of the precombustion chamber central axis CS. As shown in FIG. 7, each inner recess 38 is shaped into a slit extending from the bottom surface 311 of the small-diameter cylinder chamber 310 to the stepped surface 322 of the large-diameter cylinder chamber 320 in the extension direction of the precombustion chamber central axis CS. The inner recesses 38 are recessed from the bottom surface 311 and the wall surface 312 of the small-diameter cylinder chamber 310 so as to have a contact depth and an arc-shaped bottom surface on the inner side (a side facing the main combustion chamber 20). As shown in FIG. 8, the inner recesses 38 are connected to each other at the bottom surface 311 of the small-diameter cylinder chamber 310. Accordingly, as shown in FIG. 8, the thickness T of a part of the tip portion 33 in the circumferential direction provided with the inner recess 38 is less than the thickness T1 of a remaining part in the circumferential direction not provided with the inner recess 38. Here, the thickness T1 is equal to the nozzle hole length L of the nozzle hole 4 as described above.

According to the above configuration, the thin region 5 (third thin region 53) includes at least one inner recess 38 formed in an inner peripheral surface (bottom surface 311, wall surface 312) of the tip portion 33 facing the precombustion chamber 30. In other words, since the thin region 5 is defined by the at least one inner recess 38 formed in the inner peripheral surface of the tip portion 33, it is possible to reduce thermal strain around the precombustion-chamber-side openings 41 of the nozzle holes 4 and thermal stress generated due to confinement of the thermal strain. When the inner recess 38 is formed to the stepped surface 343 of the cylindrical portion 34 in the extension direction of the precombustion chamber central axis CS, the inner recess 38 can be easily formed on the inner side of the tip portion 33 by cutting or the like.

In the above embodiments, as shown in FIGS. 3 and 7, the recess 35 (outer recesses 36, 37, inner recesses 38) extends from the tip portion 33 over at least a part of the cylindrical portion 34 across the reference plane RP along the extension direction of the precombustion chamber central axis CS.

With the above configuration, since the recess 35 extends from the tip portion 33 over at least a part of the cylindrical portion 34 along the extension direction of the precombustion chamber central axis CS, the at least part of the cylindrical portion 34 adjacent to the tip portion 33 has a reduced thickness. As a result, the at least part of the cylindrical portion 34 adjacent to the tip portion 33 can be easily deformed by heat, so that heat in the tip portion 33 easily transfers to the cylindrical portion 34. Thus, it is possible to reduce thermal strain around the nozzle holes and thermal stress generated due to confinement of the thermal strain.

Figure 9:
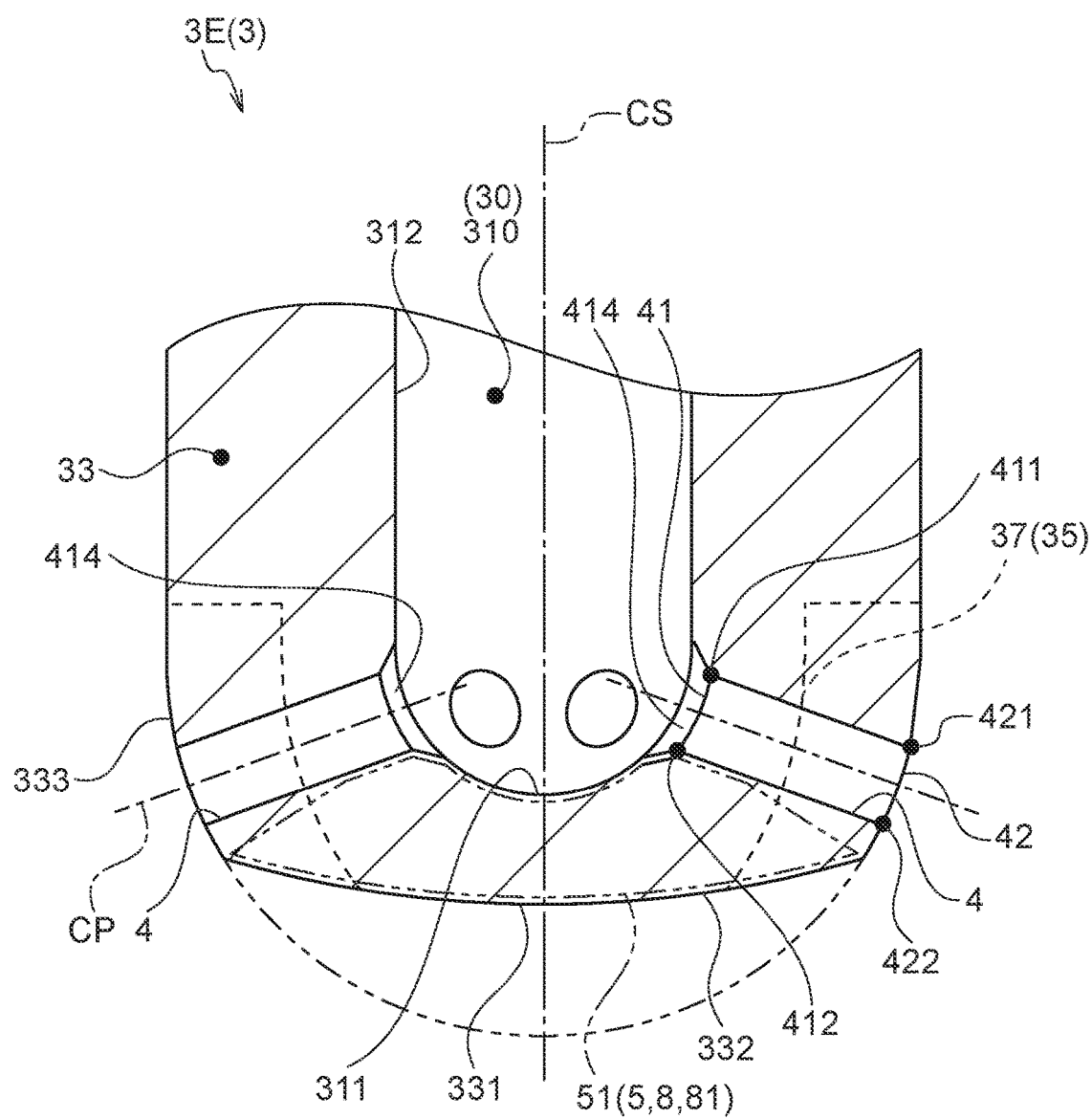
FIG. 9 is a schematic enlarged cross-sectional view of the vicinity of a tip portion of a precombustion-chamber forming portion according to another embodiment for describing a chamfered shape formed on the edge of a precombustion-chamber-side opening of a nozzle hole.

FIG. 9 is a schematic enlarged cross-sectional view of the vicinity of a tip portion of a precombustion-chamber forming portion according to another embodiment for describing a chamfered shape formed on the edge of a precombustion-chamber-side opening of a nozzle hole. In the embodiment shown in FIG. 9, the precombustion-chamber forming portion 3 includes a precombustion-chamber forming portion 3E having a chamfered portion 414 on the precombustion-chamber-side opening 4. As shown in FIG. 9, the precombustion-chamber forming portion 3E has the same configuration as the precombustion-chamber forming portion 3C except that the chamfered portion 414 of C-chamfer plane is formed over the entire peripheral edge of the precombustion-chamber-side opening 41. The chamfered portion 414 may be formed on the precombustion-chamber-side opening 41 of the precombustion-chamber forming portion 3A, 3B, 3D, and 3G described later. Further, the chamfered portion may be formed over the entire periphery of the main-combustion-chamber-side opening 42. With the above configuration, since the precombustion-chamber forming portion 3E has the chamfered portion 414 on the precombustion-chamber-side opening 41, the temperature of the portion forming the precombustion-chamber-side opening 41 is reduced compared to when the chamfered portion 414 is not provided. Thus, it is possible to reduce thermal strain around the precombustion-chamber-side openings 41 of the nozzle holes 4 and thermal stress generated due to confinement of the thermal strain.

(Temperature Analysis Result and Stress Analysis Result)

Stress analysis was performed on the basis of temperature analysis and temperature analysis results for the precombustion-chamber forming portion 3 of the precombustion chamber gas engine 1 according to the above embodiments. Details will be described. Temperature analysis was performed with varying thermal conditions, e.g., varying atmosphere temperature and heat transfer coefficient during engine operation, according to each surface such as the tip surface 332 and the outer peripheral surface 333 of the tip portion 33 of the precombustion-chamber forming portion 3 (precombustion chamber cap 19) disposed on the cylinder head 12, the stepped surface 343 and the outer peripheral surface 344 of the cylindrical portion 34, and the bottom surface 311 and the wall surface 312 of the small-diameter cylinder chamber 310, to estimate the temperature change of the precombustion-chamber forming portion 3.

Figure 10:
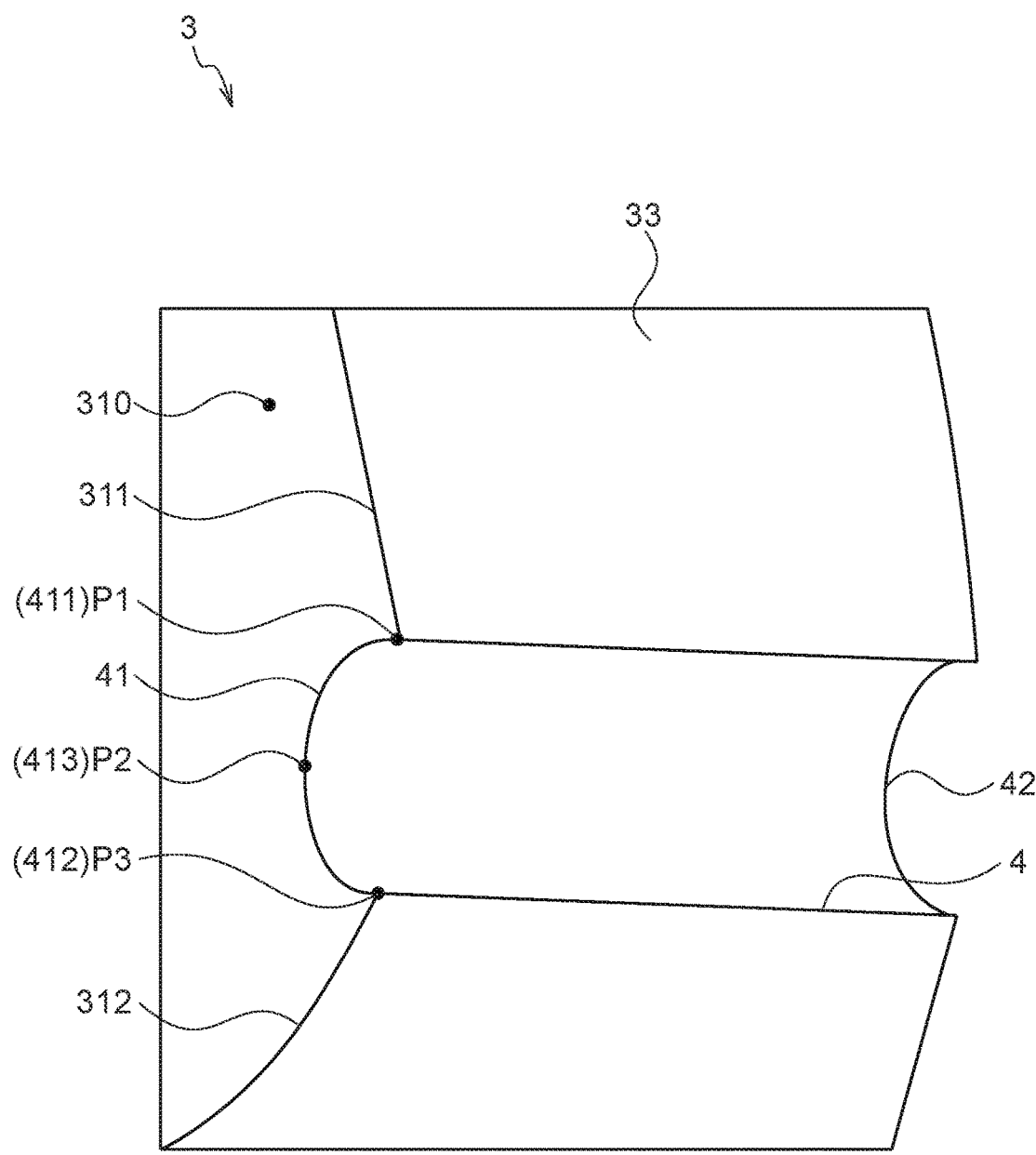
FIG. 10 is a diagram for describing temperature analysis result and stress analysis result around a nozzle hole of a precombustion-chamber forming portion.

FIG. 10 is a diagram for describing temperature analysis result and stress analysis result around a nozzle hole of a precombustion-chamber forming portion. As a result of the temperature analysis, the temperature of the precombustion-chamber-side opening 41 of the nozzle hole 4 shown in FIG. 10 more rapidly changed than the other part of the precombustion-chamber forming portion 3 and was raised to higher temperature than the other part of the precombustion-chamber forming portion 3. On the basis of this temperature analysis result, stress analysis was performed to estimate strain change and calculate a strain range at each of measurement points P1 to P3. The measurement point P1 is located on the upper edge 411 of the precombustion-chamber-side opening 41, and the measurement point P3 is located on the lower edge 412 of the precombustion-chamber-side opening 41. The measurement point P2 is located on an intermediate edge 413 between the upper edge 411 and the lower edge 412 of the precombustion-chamber-side opening 41 in the extension direction of the precombustion chamber central axis CS. If the precombustion-chamber-side opening 41 has the chamfered portion 414 as described above, as shown in FIG. 9, the upper edge 411, the lower edge 412, and the intermediate edge 413 are disposed on the peripheral edge of the chamfered portion 414 closer to the main combustion chamber 20.

FIG. 11 is a table showing a dimensionless strain range of a precombustion-chamber-side opening of a precombustion-chamber forming portion having a first thin region, compared to a precombustion-chamber forming portion not having the thin region. FIG. 12 is a table showing a dimensionless strain range of a precombustion-chamber-side opening of a precombustion-chamber forming portion having a first thin region, a second thin region, and a chamfered shape on the edge of a precombustion-chamber-side opening, compared to a precombustion-chamber forming portion not having the thin region. 3F in FIGS. 11 and 12 is a precombustion-chamber forming portion having a tip as shown by the two-dot chain line in FIG. 2 and not having the thin region 5.

In FIG. 11, strain ranges of the precombustion-chamber forming portion 3F and the precombustion-chamber forming portion 3A at each measurement point P1 to P3 are expressed dimensionlessly as the ratio when the strain range of the precombustion-chamber forming portion 3F is 1, and the reduction rate of the precombustion-chamber forming portion 3A with respect to the precombustion-chamber forming portion 3F is shown. As shown in FIG. 11, the precombustion-chamber forming portion 3A having the first thin region 51 has a reduced strain range at the measurement point P2, compared to the precombustion-chamber forming portion 3F. Thus, the precombustion-chamber forming portion 3A can suppress the occurrence of crack generated between a pair of circumferentially adjacent nozzle holes 4, compared to the precombustion-chamber forming portion 3F.

In FIG. 12, strain ranges of the precombustion-chamber forming portion 3F and the precombustion-chamber forming portion 3E at each measurement point P1 to P3 are expressed dimensionlessly as the ratio when the strain range of the precombustion-chamber forming portion 3F is 1, and the reduction rate of the precombustion-chamber forming portion 3E with respect to the precombustion-chamber forming portion 3F is shown. As shown in FIG. 12, the precombustion-chamber forming portion 3E having the first thin region 51, the second thin region 52, and the chamfered portion 414 on the precombustion-chamber-side opening 41 has reduced strain ranges at all measurement points P1 to P3, compared to the precombustion-chamber forming portion 3F. Further, the precombustion-chamber forming portion 3E has a larger reduction rate with respect to the precombustion-chamber forming portion 3F than the precombustion-chamber forming portion 3A shown in FIG. 11. Thus, the precombustion-chamber forming portion 3E can reduce thermal stress generated around the nozzle holes 4 and suppress the occurrence of crack, compared to the precombustion-chamber forming portions 3A and 3F.

Although in the above embodiments, the tip portion 33 has the thin region 5 having a thickness T satisfies T<L, in the following embodiments, the tip portion 33 has a thin region 8 having a thickness T satisfies T<T0. Details will be described.

Figure 13:
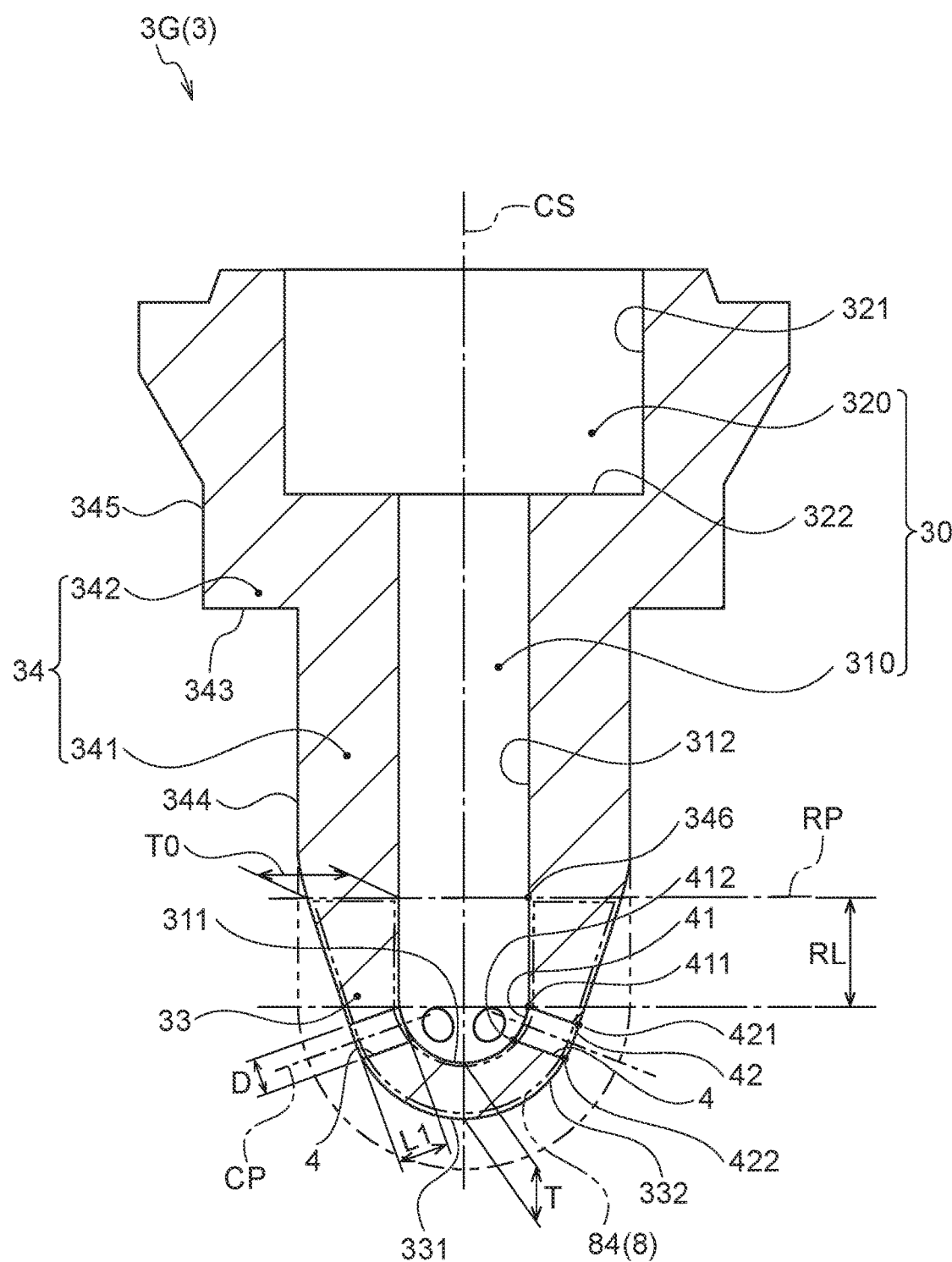
FIG. 13 is a schematic cross-sectional view of a precombustion-chamber forming portion according to another embodiment.

As shown in FIGS. 2, 3, 5, 7, and 13, the precombustion-chamber forming portion 3 of the precombustion chamber gas engine 1 according to some embodiments includes the cylindrical portion 34 extending along the extension direction (vertical direction in the figures) of the precombustion chamber central axis CS of precombustion-chamber forming portion 3, and the tip portion 33 closing one end (lower end) of the cylindrical portion 34 closer to the main combustion chamber 20. FIG. 13 is a schematic cross-sectional view of a precombustion-chamber forming portion according to another embodiment.

As shown in FIGS. 2, 3, 5, 7, and 13, the reference plane RP passes through a position 346 away from the upper edge 411 of the precombustion-chamber-side opening 41 of the nozzle hole 4 by a reference length RL in a direction opposite to the main combustion chamber 20 (lower side in the figures) along the extension direction of the precombustion chamber central axis CS and extends in a direction perpendicular to the precombustion chamber central axis CS. The reference length RL is three times (predetermined times) the nozzle hole diameter D of the nozzle hole 4. As shown in FIGS. 2, 3, 5, 7 and 13, the tip portion 33 is located on the main combustion chamber 20 side of the reference plane RP. In other words, the reference plane RP is away from the nozzle hole 4 and thus is less affected by heat of the combustion flame. In contrast, the tip portion 33 located closer to the main combustion chamber 20 than the reference plane RP is greatly affected by heat of the combustion flame. Accordingly, the provision of the thin region 8 is more effective in the tip portion 33 than in the cylindrical portion 34.

As shown in FIGS. 2, 4 to 6, 8, 9, and 13, the tip portion 33 has the thin region 8 having a thickness T satisfying T<T0, where T0 is the thickness of the precombustion-chamber forming portion 3 at the reference plane RP. In the embodiments shown in FIGS. 2 to 9, a portion of the precombustion-chamber forming portion 3 between the reference plane RP and a plane passing through the upper edge 411 of the precombustion-chamber-side opening 41 of the nozzle hole 4 and extending in a direction perpendicular to the precombustion chamber central axis CS has a cylindrical shape with a constant cross-sectional shape along a direction perpendicular to the precombustion chamber central axis CS. Accordingly, the thickness T1 of a part of the tip portion 33 in the circumferential direction in a cross-section passing through the upper edge 411 of the precombustion-chamber-side opening 41 of the nozzle hole 4 and extending in a direction perpendicular to the precombustion chamber central axis CS is equal to the thickness T0 at the reference plane RP. In the embodiments shown in FIGS. 2 to 9, as described above, the thickness T1 is equal to the nozzle hole length L of the nozzle hole 4. Although in the embodiments shown in FIGS. 3 to 9, the thickness is not constant in the circumferential direction, in this case, the maximum thickness in the circumferential direction is the thickness T0 or the thickness T1.

In the embodiments shown in FIGS. 2, 5, and 9, the thin region 8 includes a first thin region 81 that is identical to the first thin region 51 of the thin region 5. In the embodiments shown in FIGS. 4 and 6, the thin region 8 includes a second thin region 82 that is identical to the second thin region 52 of the thin region 5. Accordingly, the second thin region 82 includes a portion of the tip portion 33 between a pair of nozzle holes 4 adjacent in the circumferential direction of the tip portion 33. Further, the second thin region 82 includes at least one outer recess 36, 37 formed in an outer peripheral surface (tip surface 332, outer peripheral surface 333) of the tip portion 33 facing the main combustion chamber 20. In the embodiment shown in FIG. 8, the thin region 8 includes a third thin region 83 that is identical to the third thin region 53 of the thin region 5. Accordingly, the third thin region 83 includes a portion of the tip portion 33 between a pair of nozzle holes 4 adjacent in the circumferential direction of the tip portion 33. Further, the third thin region 83 includes at least one inner recess 38 (recess 35) formed in an inner peripheral surface (bottom surface 311, wall surface 312) of the tip portion 33 facing the precombustion chamber 30.

In the embodiment shown in FIG. 13, the precombustion-chamber forming portion 3 includes a precombustion-chamber forming portion 3G having the thin region 8 including a fourth thin region 84. As shown in FIG. 13, the tip portion 33 of the precombustion-chamber forming portion 3G has a thickness gradually decreasing toward the tip 331 in a region from the upper edge 421 of the main-combustion-chamber-side opening 42 of the nozzle hole 4 to the cylindrical portion 34 in the extension direction of the precombustion chamber central axis CS and a constant thickness equal to the nozzle hole length L1 in a region from the upper edge 421 to the tip 331. Thus, the thickness T of the tip portion 33 is less than the thickness T0 at the reference plane RP. As shown in FIG. 13, the fourth thin region 84 is formed from the tip 331 to an upper side of the upper edge 421 of the main-combustion-chamber-side opening 42 in the extension direction of the precombustion chamber central axis CS.

According to the above configuration, the tip portion 33 of the precombustion-chamber forming portion 3 is located on the main combustion chamber 20 side of the reference plane RP passing through a position 346 away from the upper edge 411 of the precombustion-chamber-side opening 41 of the nozzle hole 4 by a reference length RL, i.e., by a length three times (predetermined times) the nozzle hole diameter D of the nozzle hole 4, in a direction opposite to the main combustion chamber 20 along the extension direction of the precombustion chamber central axis CS and extending in a direction perpendicular to the precombustion chamber central axis CS. Further, the tip portion 33 has the thin region 8 having a thickness T satisfying T<T0, where T0 is the thickness of the precombustion-chamber forming portion 3 at the reference plane RP. In other words, the thickness T of the thin region 8 is less than that at the reference plane RP which is less affected by the combustion flame. When such a thin region 8 is formed around the nozzle holes 4 of the tip portion 33, which are largely affected by heat of the combustion flame, it is possible to reduce the heat capacity and stiffness around the nozzle holes 4, and it is possible to flatten the temperature distribution (temperature difference) around the nozzle holes 4 at temperature rise. Reducing the heat capacity and stiffness around the nozzle holes 4 facilitates thermal deformation (thermal expansion and thermal contraction) around the nozzle holes 4, thus reducing thermal strain around the nozzle holes 4 and thermal stress generated due to confinement of the thermal strain. Further, flattening the temperature distribution around the nozzle holes 4 at temperature rise suppresses non-uniform thermal deformation around the nozzle holes 4, thus reducing thermal strain around the nozzle holes 4 and thermal stress generated due to confinement of the thermal strain. Consequently, it is possible to suppress the occurrence of crack around the nozzle holes 4 due to heat fatigue.

In some embodiments, as shown in FIGS. 2, 5, and 13, the thin region 8 (first thin region 81, fourth thin region 84) includes the tip 331.

With the above configuration, since the thin region 8 (first thin region 81, fourth thin region 84) includes the tip 331 of the tip portion 33, the thickness of the tip 331 of the tip portion 33 is reduced compared to when the thin region 8 is not present in the tip 331 of the tip portion 33. Thus, the heat capacity and stiffness around the nozzle holes 4 are reduced, and the temperature distribution around the nozzle holes 4 at temperature rise is flattened. As a result, it is possible to suppress the occurrence of crack around the nozzle holes 4 due to heat fatigue. Incidentally, the thin region 8 including the tip 331 of the tip portion 33 can be easily formed in the precombustion-chamber forming portion 3 having no thin region 8 in the tip 331 of the tip portion 33, by cutting or the like.

In some embodiments, as shown in FIG. 13, the thin region 8 (fourth thin region 84) includes at least a part of the peripheral edge of the main-combustion-chamber-side opening 42 of the nozzle hole 4 in the tip portion 33. Here, the peripheral edge of the main-combustion-chamber-side opening 42 includes the upper edge 421 and the lower edge 422 as shown in FIG. 13. In this case, since the nozzle hole length L1 of the nozzle hole 4 is shorter than the nozzle hole length L, the thickness of a portion of the tip portion 33 forming the inner periphery of the nozzle hole 4 is reduced. In the embodiment shown in FIG. 13, the fourth thin region 84 includes both the upper edge 421 and the lower edge 422 of the main-combustion-chamber-side opening 42 of the nozzle hole 4.

With the above configuration, since the thin region 8 (fourth thin region 84) includes at least a part of the peripheral edge of the main-combustion-chamber-side opening 42 of the nozzle hole 4 in the tip portion 33, the thickness around the nozzle holes 4 is reduced. Thus, the heat capacity and stiffness around the nozzle holes 4 are reduced, and the temperature distribution around the nozzle holes 4 at temperature rise is flattened. As a result, it is possible to suppress the occurrence of crack around the nozzle holes 4 due to heat fatigue.

Although in the above embodiments, as shown in FIGS. 2, 3, 5, 7, and 13, the reference length RL between the upper edge 411 and the position 346 is three times (predetermined times) the nozzle hole diameter D of the nozzle hole 4, the reference length RL may be longer or shorter than three times the nozzle hole diameter D, for example, equal to or twice the nozzle hole diameter D of the nozzle hole 4. Alternatively, the reference length RL may be zero. When the reference length RL is shortened or zero, the reference plane RP may be disposed in a position according to the reference length RL. When the reference length is shortened, the range of the tip portion 33 is reduced, so that the thin region 8 is formed around the nozzle holes 4. Thus, it is possible to reduce thermal strain around the nozzle holes 4 and thermal stress generated due to confinement of the thermal strain, compared to when the reference length RL is elongated.

Although in the above embodiments, the thin region 5 is a region having a thickness T satisfying T<T0, and the thin region 8 is a region having a thickness T satisfying T<L, in some embodiments, in addition to the above conditions of thickness T, the thickness T of the thin region 5 or the thin region 8 may be set to a minimum that can withstand the internal pressure applied to the precombustion-chamber forming portion 3. A thinner thickness T provides less strength than a thicker thickness T, but provides less heat capacity and stiffness around the nozzle holes 4, thus reducing thermal stress generated around the nozzle holes 4. When the thin region 5 or the thin region 8 is within the above range, it is possible to effectively suppress the occurrence of crack while maintaining strength necessary for the precombustion-chamber forming portion 3.

Further, in some embodiments described above, the thin region 5 or the thin region 8 does not include the peripheral edge of the precombustion-chamber-side opening 41 and the main-combustion-chamber-side opening 42 of the nozzle hole 4. In this case, since the nozzle hole diameter D and the nozzle hole length L of the nozzle hole 4 are maintained, it is possible to maintain the performance of the combustion flame injected from the nozzle hole 4.

Further, although in some embodiments described above, the recess 35 is formed along the extension direction of the precombustion chamber central axis CS, the recess may be formed along another direction. For instance, the recess may be formed along the circumferential direction of the tip portion 33 or the cylindrical portion 34.

The present invention is not limited to the embodiments described above, but includes modifications to the embodiments described above, and embodiments composed of combinations of those embodiments.

REFERENCE SIGNS LIST

1 Precombustion chamber gas engine
11 Cylinder block
12 Cylinder head
13 Cylinder
14 Piston
15 Intake port
16 Exhaust port
17 Intake valve
18 Exhaust valve
19 Precombustion chamber cap
2 Main-chamber forming portion
20 Main combustion chamber
3, 3A to 3G Precombustion-chamber forming portion
30 Precombustion chamber
31 Small-diameter-cylinder forming portion
310 Small-diameter cylinder chamber
311 Bottom surface
312 Wall surface
32 Large-diameter-cylinder forming portion
320 Large-diameter cylinder chamber
321 Wall surface
322 Stepped surface
33 Tip portion
331 Tip
332 Tip surface
333 Outer peripheral surface
34 Cylindrical portion
341 Small-diameter cylindrical portion
342 Large-diameter cylindrical portion
343 Stepped surface
344, 345 Outer peripheral surface
346 Position
35 Recess
36, 37 Outer recess
38 Inner recess
4 Nozzle hole
41 Precombustion-chamber-side opening
411 Upper edge
412 Lower edge
413 Intermediate edge
414 Chamfered portion
42 Main-combustion-chamber-side opening
421 Upper edge
422 Lower edge
5 Thin region
51 First thin region
52 Second thin region
53 Third thin region
6 Ignition device
61 Ignition portion
7 Precombustion-chamber-gas supply device
71 Precombustion-chamber-fuel-gas supply valve
8 Thin region
81 First thin region
82 Second thin region
83 Third thin region
84 Fourth thin region
CM Main chamber central axis
CP Central axis of nozzle hole
CS Precombustion chamber central axis
D Nozzle hole diameter
L, L1 Nozzle hole length
P1 to P3 Measurement point
RL Reference length
RP Reference plane
T, T0, T1 Thickness

The invention claimed is:
1. A precombustion chamber gas engine comprising:
 a main-chamber forming portion forming a main combustion chamber; and a precombustion-chamber forming portion forming a precombustion chamber communicating with the main combustion chamber via a plurality of nozzle holes, wherein the precombustion-chamber forming portion includes a cylindrical portion extending along an extension direction of a precombustion chamber central axis of the precombustion-chamber forming portion, and a tip portion closing a main-combustion-chamber-side end of the cylindrical portion and having the nozzle holes, wherein the tip portion includes a thin region having a thickness T satisfying T<L where L is a length of each nozzle hole, and wherein the thin region includes a recess formed in a region including a portion of the tip portion between a pair of nozzle holes adjacent each other in a circumferential direction of the tip portion.

2. A precombustion chamber gas engine comprising:

a main-chamber forming portion forming a main combustion chamber; and a precombustion-chamber forming portion forming a precombustion chamber communicating with the main combustion chamber via a plurality of nozzle holes, wherein the precombustion-chamber forming portion includes a cylindrical portion extending along an extension direction of a precombustion chamber central axis of the precombustion-chamber forming portion, and a tip portion closing a main-combustion-chamber-side end of the cylindrical portion and having the nozzle holes, wherein the tip portion is located on a main combustion chamber side of a reference plane that extends in a direction perpendicular to the precombustion chamber central axis at a position away from an upper edge of a precombustion-chamber-side opening of each nozzle hole by a length predetermined times a diameter of each nozzle hole in a direction opposite to the main combustion chamber along the extension direction of the precombustion chamber central axis, wherein the tip portion includes a thin region having a thickness T satisfying T<T0 where T0 is a thickness of the precombustion-chamber forming portion at the reference plane, and wherein the thin region includes a recess formed in a region including a portion of the tip portion between a pair of nozzle holes adjacent each other in a circumferential direction of the tip portion.

3. The precombustion chamber gas engine according to claim 1, wherein the thin region includes a tip of the tip portion.

4. The precombustion chamber gas engine according to claim 2, wherein the thin region includes a tip of the tip portion.

5. The precombustion chamber gas engine according to claim 2, wherein the thin region includes at least a part of a peripheral edge of a main-combustion-side opening of each nozzle hole in the tip portion.

6. The precombustion chamber gas engine according to claim 1, wherein the thin region includes at least one outer recess formed in an outer peripheral surface of the tip portion facing the main combustion chamber.

7. The precombustion chamber gas engine according to claim 1, wherein the thin region includes at least one inner recess formed in an inner peripheral surface of the tip portion facing the precombustion chamber.

8. The precombustion chamber gas engine according to claim 2, wherein the thin region includes at least one outer recess formed in an outer peripheral surface of the tip portion facing the main combustion chamber.

9. The precombustion chamber gas engine according to claim 2, wherein the thin region includes at least one inner recess formed in an inner peripheral surface of the tip portion facing the precombustion chamber.

* * * * *